Oct. 20, 1942.                C. ROSSETTI                2,299,428
       METHOD FOR MANUFACTURING A HIGHLY ACTIVE
           DEPOLARIZER FROM NATURAL PYROLUSITE
                   Filed June 18, 1938
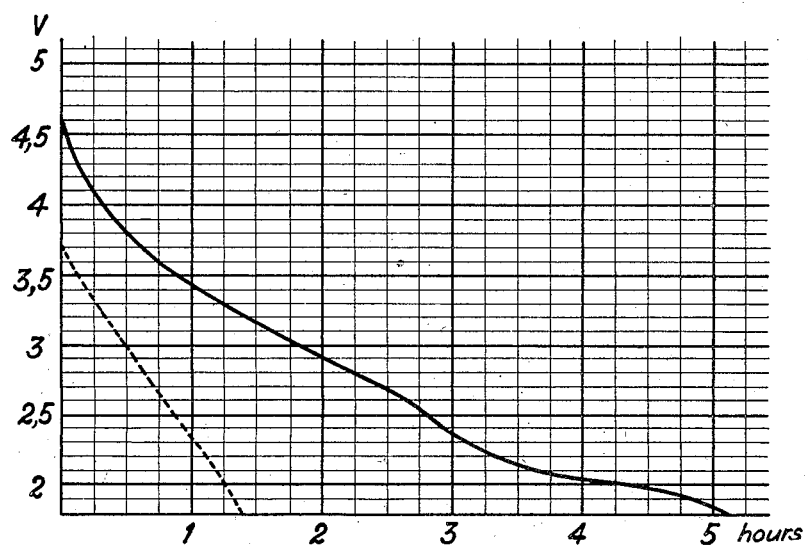
INVENTOR
CARLO ROSSETTI
BY Young, Emery & Thompson
ATTYS.

Patented Oct. 20, 1942

2,299,428

UNITED STATES PATENT OFFICE 2,299,428

METHOD FOR MANUFACTURING HIGHLY ACTIVE DEPOLARIZER FROM NATURAL PYROLUSITE

Carlo Rossetti, Yverdon, Switzerland, assignor to the firm Leclanché S. A., Yverdon, Switzerland, a joint-stock company of Switzerland Application June 18, 1938, Serial No. 214,597
In Switzerland October 29, 1937

5 Claims. (Cl. 204—83)

The invention relates to a method of manufacturing a highly active depolarizer from natural pyrolusite.

The use of bioxide of manganese as a depolariser in cells of the Leclanché type is well known. Natural oxides are used as well as artificial bioxide or mixtures of either with an addition of graphite. But the natural oxides do not possess a depolarizing capacity high enough for the present needs of the technics. As regards the artificial bioxides obtained up to date, they cost by far too much.

The method according to the present invention permits of obtaining cheaply by starting from an oxide of common commercial pyrolusite a depolariser of much higher activity than that of the not treated natural bioxides. This method is characterised in that first the ore is roasted in presence of a reducing agent like carbon under such conditions of temperature and time that at least the main body of the manganese dioxide is reduced to a mixture of lower oxides, and that said reduced mixture is mixed with a neutral aqueous solution of manganese sulphate and that the mixture is submitted to electrolysis until permanent acid reaction appears and that finally the depolarizer is filtered from the remaining solution of manganese sulphate.

The first phase of the process consists in reducing the natural bioxide of manganese into a mixture of oxides presenting a lower degree of oxydation than $Mn_2O_3$, which may be considered as a mixture of $MnO_2$ and $MnO$. This reduction is generally operated by roasting it in a furnace in the presence of a reducing means for instance carbon.

In the second phase the reduction mass is held in suspension in a solution of manganese sulphate and the whole is submitted to electrolysis. By this the electrolyte $MnSO_4$ is dissociated into $H_2SO_4$ and $MnO_2$. The sulphuric acid as soon as formed attacks the MnO of the mixture and reforms again $MnSO_4$, while the newly formed $MnO_2$ is precipitated into intimate mixture with the $MnO_2$ of the reduction mass which is suspended within the electrolyte. The electrolysis is continued until almost all the MnO of the reduction mass has been reformed into $MnO_2$. The disappearance of MnO is cognisable by the appearance of a permanent acid reaction produced by the presence of sulphuric acid freed from the electrolyte $MnSO_4$ and finding practically no more MnO to be dissolved. At the end of the electrolysis there will be found therefore, on the one side a depolarising precipitate composed essentially of $MnO_2$ whereof however a part is $MnO_2$ freshly precipitated, in a high active state, and on the other side a very slightly acidulated solution of $MnSO_4$ of about the same concentration as that of the solution at the start. A simple filtering by known means permits the separating of the activated depolariser of the manganese sulphate which is ready for use for a next operation.

The conditions of the electrolyses are chosen such that the best electrolytic efficiency is obtained. This efficiency may amount to 95%, while for the electrolysis of a solution of $MnSO_4$ alone this efficiency is notoriously lower. The concentration of the electrolyte may advantageously be chosen between 20 and 30% and the temperature of the electrolysis between 80° and 100° C. An energetic stirring up during the electrolysis is propitious. This stirring up begun at a pH of 6.5 to 7 is interrupted when the pH reaches about 4.

It must be remarked that the present invention permits a practically complete recuperation of the $MnSO_4$ serving as the electrolyte.

On the other hand the greater part of the metallic impurities to be found in the commercial bioxide are eliminated at the cathode. This contributes to enrich and to activate the depolariser. This is true particularly for the oxides of the copper group which has notoriously a noxious effect upon the cells of the Leclanché type. Silica constitutes the most frequent impurity of natural pyrolusite; for this reason a fluorin salt is added to the neutral solution of manganous sulphate before the electrolysis; by the electrolysis, HF is formed, which attacks the silica and forms volatile $SiF_4$.

Since the depolarizing action is principally a surface reaction, the surface area of a part of the $MnO_2$ produced according to the invention may be increased by suddenly quenching the still hot reduced mass in the electrolyte.

*Example*

A commercial pyrolusite is roasted in a furnace at a temperature of 600 to 700° during 30 minutes for obtaining a separation of the bioxide into a mixture of lower oxides. The mass of reduction is then poured and distributed by an energetic stirring up into a solution of 25% of $MnSO_4$. For 1 kilogram of reducing mass 10 liters of said solution are used. The whole is heated to about 100° C. and while stirring up continuously this temperature is maintained, subjected to electrolysis at a density of current of 2 amperes per $dm.^2$ of surface of positive electrode. The pH of electrolyte which is 7 will soon diminish, until it is 4 whereupon the operation is stopped. The product is filtered by a filter press and after a rapid washing the depolariser and the mother liquor are collected with a view of a subsequent straining. Yield 1.4 kg. of depolariser per 1 kg. of reduction mass.

Consumption of current 2 kwh. per kg. of dried depolarizing mass obtained.

The current density may be in the range of 1.8–2.2 amperes per $dm.^2$.

The depolariser thus obtained is a high quality product having undergone an activation by oxidation, by chemical purifying and by modifying its state of molecular aggregation. Compared to a natural bioxide of manganese not treated its electromotive force is greater, its duration of discharge has considerably increased such, as is shown in the diagram.

This diagram represents as an example two discharge curves of Leclanché cells mounted with natural oxide of manganese.

In the diagram the full line curve is the discharge curve of a natural oxide of manganese treated according to the method of the invention. The curve with dotted lines corresponds to a natural oxide of manganese not treated. In both cases the oxide of manganese was mixed with graphite in a ratio of combination of 75% of oxide of manganese and 25% of graphite.

The tension in volts is represented by the ordinates and the duration by the abscissae.

The characteristics of the two comparative tests are given in the following table:

| Depolarizer | Weight of the depolarizing mass | Dimension of the mass | Electromotive force |
|---|---|---|---|
| | Gr. | Mm. | |
| $MnO_2$ treated | 9.5 | 15–38 | 4.90 |
| $MnO_2$ not treated | 13.2 | 15–38 | 4.56 |

Continuous discharge with 15 ohms and at 20° C.

The chemical activity of the treated product according to the method of the present invention is also disclosed by its behavior in the presence of oxalic acid. This acid reduces the product rapidly and vigorously while it attacks only slowly and when heated the bioxide of manganese not treated. The apparent specific gravity of the activated product by the method according to the invention is diminished in the ratio of 1 to about 0.6 as compared to the non treated product. The value of the pH of the activated product is likewise higher than that of the non-treated product.

What I claim is:

1. A method of manufacturing manganese dioxide of high depolarizing capacity comprising, roasting natural pyrolusite in presence of carbon to reduce it into a mixture of lower oxides which has less content of oxygen than $Mn_2O_3$, suspending the reduced mass in a neutral aqueous solution of manganous sulphate, directly submitting the aqueous suspension so obtained to electrolysis until permanent acid reaction appears, thereby forming on the one hand a depolarizing precipitate composed essentially of $MnO_2$ whereof a part is freshly precipitated $MnO_2$ in a highly active state and the other part is original $MnO_2$ the surface area of which is increased by freeing it from its content of lower oxides, and, on the other hand, regenerating the manganous sulphate solution used, and finally filtering the depolarizing precipitate from the remaining solution of manganous sulphate.

2. A method of manufacturing manganese dioxide of high depolarizing capacity comprising, roasting natural pyrolusite in presence of carbon to reduce it into a mixture of lower oxides, which has less content of oxygen than $Mn_2O_3$, suddenly quenching of the still hot reduced mass in a neutral aqueous solution of manganous sulphate, directly submitting the aqueous suspension so obtained to electrolysis until permanent acid reaction appears, thereby forming on the one hand a depolarizing precipitate composed essentially of $MnO_2$ whereof a part is freshly precipitated $MnO_2$ in a highly active state and the other part is original $MnO_2$, the surface area of which is increased by freeing it from its content of lower oxides, and, on the other hand, regenerating the manganous sulphate solution used, and finally filtering the depolarizing precipitate from the remaining solution of manganous sulphate.

3. A method of manufacturing manganese dioxide of high depolarizing capacity comprising roasting natural pyrolusite in presence of carbon to reduce it into a mixture of lower oxides which has less content of oxygen than $Mn_2O_3$, suddenly quenching of the still hot reduced mass in a neutral aqueous solution of manganous sulphate in proportion of 8 to 12 liters of a 20 to 30% $MnSO_4$ solution for 1 kg. reduced mass, directly submitting the aqueous suspension so obtained to electrolysis at a temperature between 80° and 100° C. with a current density of 1.8 to 2.5 amperes per $dm.^2$ surface of the positive electrode and while energetically stirring the suspension until the pH of the electrolyte reaches 4, thereby forming on the one hand a depolarizing precipitate composed essentially of $MnO_2$ whereof a part is freshly precipitated $MnO_2$ in a high active state and the other part is original $MnO_2$, the surface area of which is increased by freeing it from its content of lower oxides, and on the other hand, regenerating the 20 to 30% manganous sulphate solution, and finally filtering the depolarizing precipitate from the remaining solution of manganous sulphate.

4. A method of manufacturing manganese dioxide of high depolarizing capacity comprising, roasting natural pyrolusite containing large amounts of silica in presence of carbon to reduce it into a mixture of lower oxides which has less content of oxygen than $Mn_2O_3$, suspending the reduced mass in a neutral aqueous solution of manganous sulphate and of a fluorine salt in sufficient proportion to eliminate the main body of the silica as volatile silicium fluoride, directly submitting the aqueous suspension so obtained to electrolysis until permanent acid reaction appears, thereby forming on the one hand a depolarising precipitate composed essentially of $MnO_2$ whereof a part is freshly precipitated $MnO_2$ in a highly active state and the other part is original $MnO_2$ the surface area of which is increased by freeing it from its content of lower oxides and silica, and, on the other hand, regenerating the manganous sulphate solution used, and finally filtering the depolarizing precipitate from the remaining solution of manganous solution.

5. A method of manufacturing manganese dioxide of high depolarizing capacity according to claim 1 in which the remaining solution of manganous sulphate is reused after being filtered as electrolyte for a subsequent operation.

CARLO ROSSETTI.